US005696548A

United States Patent [19]

Matsui et al.

[11] Patent Number: 5,696,548

[45] Date of Patent: Dec. 9, 1997

[54] MULTI-COLOR THERMAL PRINTER HAVING MEANS FOR EFFICIENTLY POSITIONING THE DRUM AND INKED FILM SIMULTANEOUSLY

[75] Inventors: Fumio Matsui; Toshiyuki Miyadera, both of Saitama-ken; Naoki Yoshida, Tokyo, all of Japan

[73] Assignee: Pioneer Electronic Corporation, Tokyo, Japan

[21] Appl. No.: 339,160

[22] Filed: Nov. 10, 1994

[30] Foreign Application Priority Data

| | | | |
|---|---|---|---|
| Nov. 11, 1993 | [JP] | Japan | 5-282334 |
| Nov. 11, 1993 | [JP] | Japan | 5-282335 |

[51] Int. Cl.[6] .......... B41J 17/00; B41J 2/325; G01D 15/16

[52] U.S. Cl. .......... 347/215; 347/218

[58] Field of Search .......... 347/172, 173, 347/174, 176, 101, 115, 139, 218, 215, 228; 346/138; 355/47, 88; 399/40, 117; 400/120.02, 636

[56] References Cited

U.S. PATENT DOCUMENTS

| | | | |
|---|---|---|---|
| 4,990,933 | 2/1991 | Hatakeyama et al. | 347/218 |
| 5,121,139 | 6/1992 | Burke | 347/101 |
| 5,296,874 | 3/1994 | Nagata et al. | 346/138 |
| 5,369,425 | 11/1994 | Balzeit et al. | 346/138 |

*Primary Examiner*—Benjamin R. Fuller
*Assistant Examiner*—L. Anderson
*Attorney, Agent, or Firm*—Sughrue,Mion,Zinn,Macpeak & Seas, PLLC

[57] ABSTRACT

A transmission device is provided for transmitting an output of a drum motor to a drum on which a sheet of paper is mounted, for driving the drum. The transmission device has a plurality of pulleys and a timing belt. Each of the pulleys has a plurality of grooves to be engaged with projections of the timing belt. The number of the grooves is determined to times of an integer number.

2 Claims, 15 Drawing Sheets

MULTI-COLOR THERMAL PRINTER HAVING MEANS FOR EFFICIENTLY POSITIONING THE DRUM AND INKED FILM SIMULTANEOUSLY

BACKGROUND OF THE INVENTION

The present invention relates to a thermal printer, and more particularly to a thermal printer for multi-color printing.

In the thermal printer, a thermal head has a plurality of heat resistors mounted on an insulation substrate. The resistors are electrically conducted to produce Joule heat which is applied to an heat-sensitive paper or film to print an picture or character by dots in mosaic.

The thermal printer can be made small in size at a low cost and does not produce smell and electric noises. Furthermore, the thermal printer has a good operability and is easy of to maintain. Consequently, the thermal printer is widely used in fields such as facsimile, thermal printer arrangements including printers for Chinese characters, and instruments.

FIG. 15 shows a conventional thermal printer for multi-color printing. A recording paper 1 is provided between a platen 3 and a thermal head 2. A multi-color inked ribbon 4 is provided between the recording paper 1 and the thermal head 2.

As shown in FIG. 16, the thermal head 2 comprises a base plate 5 made of aluminum. On the base plate 5, a base 6 made of ceramics and having heating elements (not shown) is mounted. A driving circuit board 7 is mounted on the base plate 5 for driving the heating elements. The circuit board 7 is protected by a cover 8. Under the base plate 5, a Peltier element 9 is secured. A head supporting member 10 having a plurality of cooling ribs 11 is provided on the base plate 5 through the element 9.

In printing operation, when Joule heat is applied from the thermal head 2 to the ribbon 4, ink of the ribbon 4 is transferred to the recording paper 1 to print a picture. In sequential printing operations, since the temperature of the thermal head 2 is increased, color tone on the paper is deteriorates. The cooling ribs 11 radiate the heat from the thermal head 2 so as to cool the head. Thus, an accurate color tone is obtained.

In such a printer, the platen 3 is rotated by a motor and a plurality of belt pulleys for feeding the paper 1 are driven in order to print a picture with multiple colors, such that the paper 1 is fed in the forward and backward directions by the rotation of the platen 3 for overlapping colors at a position. Accordingly, it is necessary to consider the relationship between the belt pulleys.

When the recording paper is returned to the position where colors are overlapped, and if the position of the paper is deflected, the quality of color printing is reduced.

Furthermore, the paper 1 and the inked ribbon 4 are moved to the initial position at a different timing. Since the paper 1 is tightly engaged with the ribbon 4 during the printing operation, it is necessary to forcibly separate them from each other. As a result, it is necessary to spend a long time printing.

SUMMARY OF THE INVENTION

An object of the present invention is to provide a multi-color thermal printer which improves the quality of multiple color printing.

Another object of the present invention is to provide a multi-color thermal printer having register means which may reduce a printing operation time.

According to the present invention, there is provided a multi-color thermal printer comprising a drum on which a sheet of paper is mounted, a drum motor for driving the drum, a clamp device for clamping the paper on the drum, a transmission device including a plurality of pulleys and a timing belt for transmitting the output of the drum motor to the drum, each of the pulleys having a plurality of grooves to be engaged with projections of the timing belt and the number of the grooves being determined to times of an integer number, an inked film unit provided adjacent the drum, the inked film unit having rollers for winding up a multi-color inked film, and a film motor for driving the rollers.

These and other objects and features of this invention will become understood from the following description with reference to the accompanying drawings.

DETAILED DESCRIPTION OF THE PREFERRED EMBODIMENT

Figure 1:
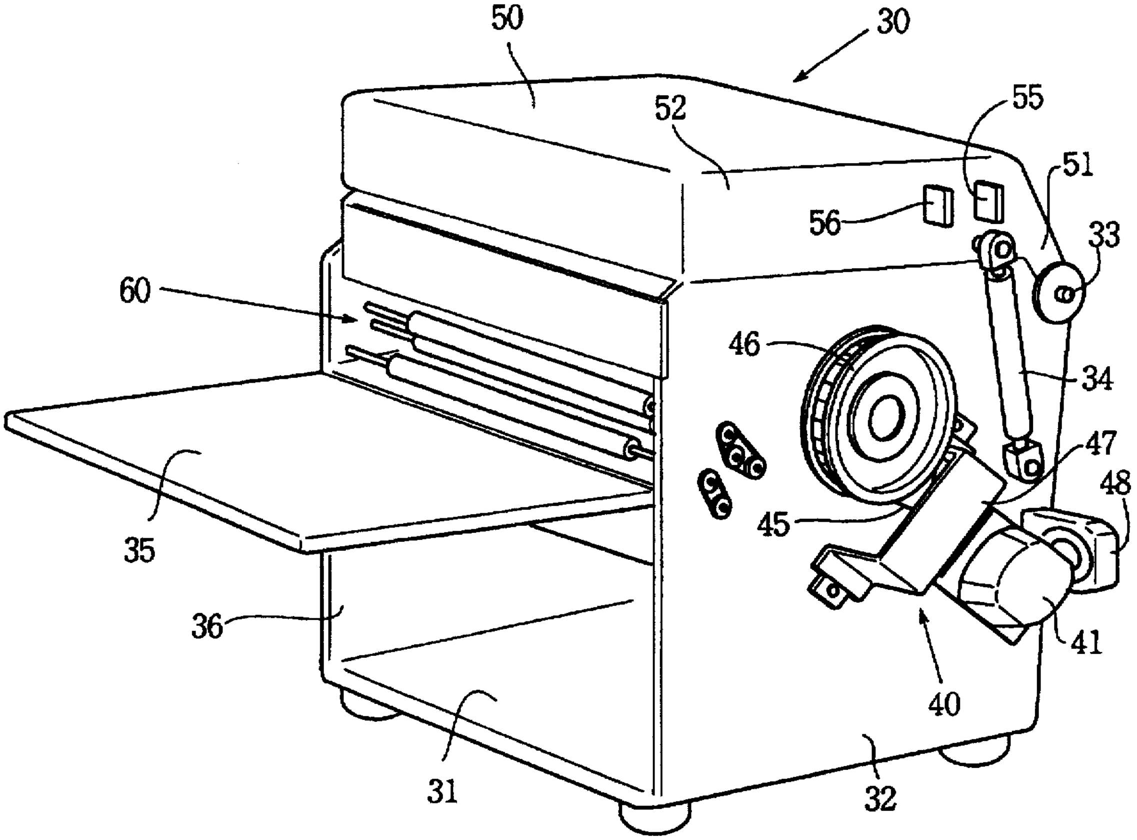
FIG. 1 is a perspective view showing a thermal printer according to the present invention viewed at the right.

Referring to FIGS. 1 to 4, a thermal printer 30 of the present invention comprises a casing 31 having a pair of side plates 32 and 36, and a cover 50 rotatably mounted on the side plates 32 and 36 of the casing 31. The cover 50 comprises a pair of side plates 52 and 53, and a pair of arm portions 51 and 54 formed extending from the respective side plates 52 and 53. The ends of the arm portions 51 and 54 are rotatably mounted on a shaft 33 which is laterally provided between the side plates 32 and 36. A damper 34 is provided between the side plate 52 of the cover 50 and the side plate 32 of the casing 31. A damper 38 is provided between the side plates 54 and 36. Thus, the cover 50 is opened and closed about the casing 31 and the dampers 34 and 38 prevent the cover 50 from radically closing.

Figure 3:
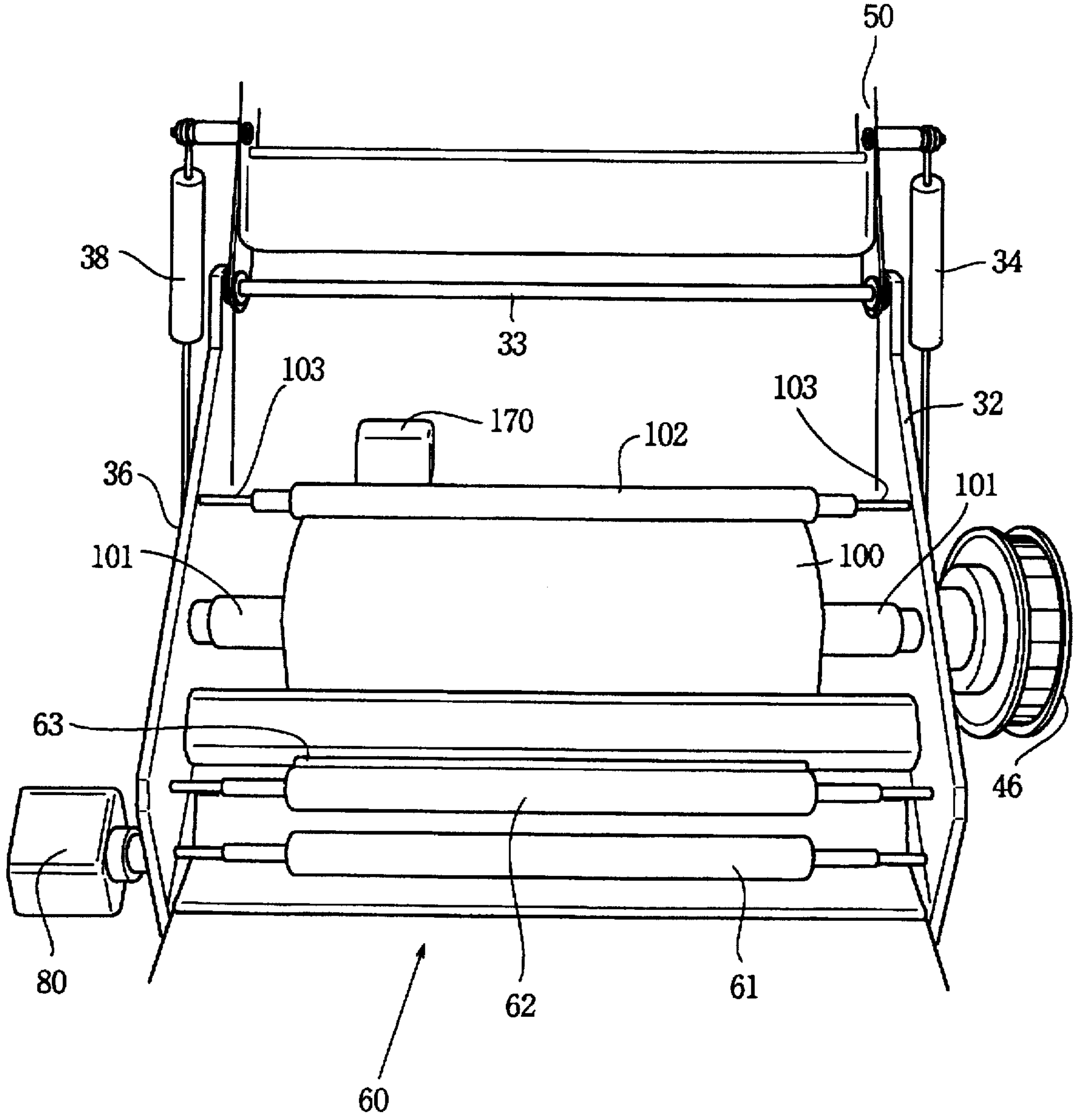
FIG. 3 is a front view showing a main part of the thermal printer.
Figure 4:
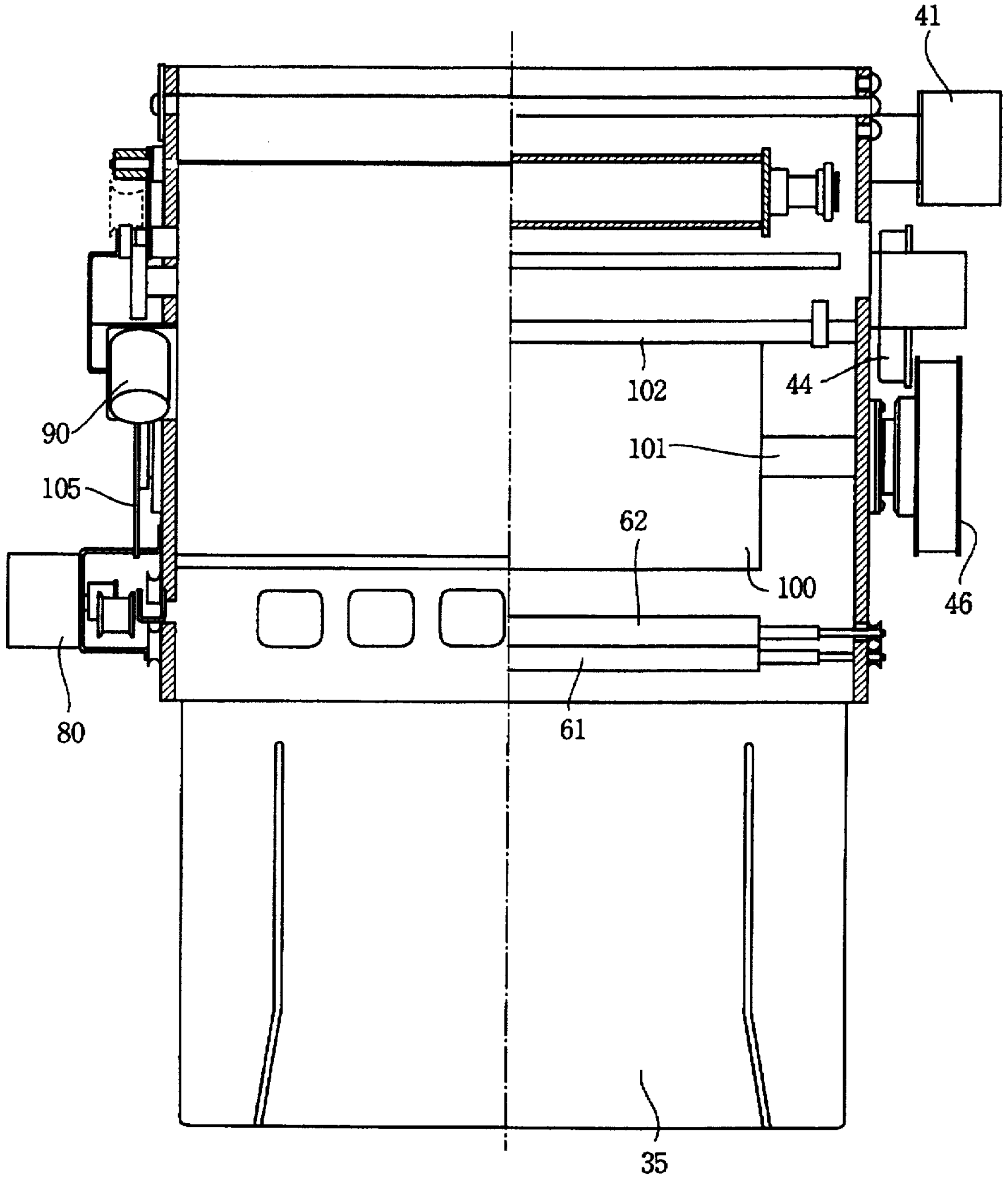
FIG. 4 is a sectional plan view of the thermal printer.
Figure 5:
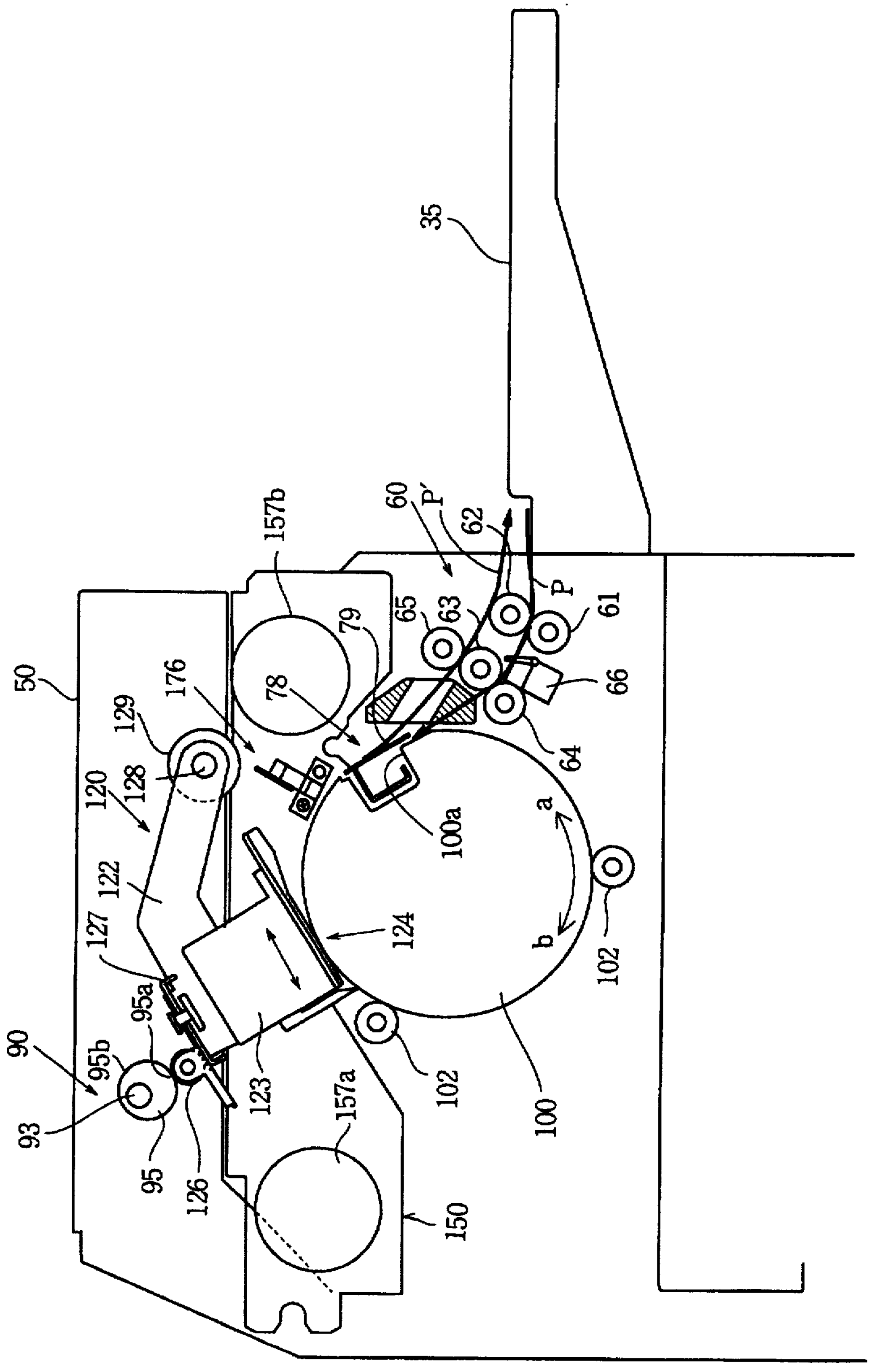
FIG. 5 is a side view showing a main part of the thermal printer.

As shown in FIGS. 3 and 5, a drum 100 for paper (not shown) is secured to a shaft 101 which is rotatably mounted on the side plates 32 and 36. Near the drum 100, a pair of rollers 102 as paper bails are rotatably mounted on shafts 103 which are secured to the side plates 32 and 36. A paper feed mechanism 60 is provided in front of the drum 100. A paper stand 35 is disposed in front of the casing 31 adjacent to the paper feed mechanism 60. The paper feed mechanism 60 comprises a plurality of rollers 61, 62, 63, 64 and 65 rotatably mounted on the side plates 32 and 36. The rollers 61 to 64 are operated to feed a sheet of paper P mounted on the paper stand 35 to the drum 100. The rollers 63 and 65 are operated to discharge a sheet of printed paper P' from the drum after the printing operation. A feed sensor 66 is provided in a space between the rollers 61 and 64 for sensing feeding conditions of the paper.

A thermal head unit 120 is provided on an upper portion of the drum 100 to be engaged with the drum.

Figure 9:
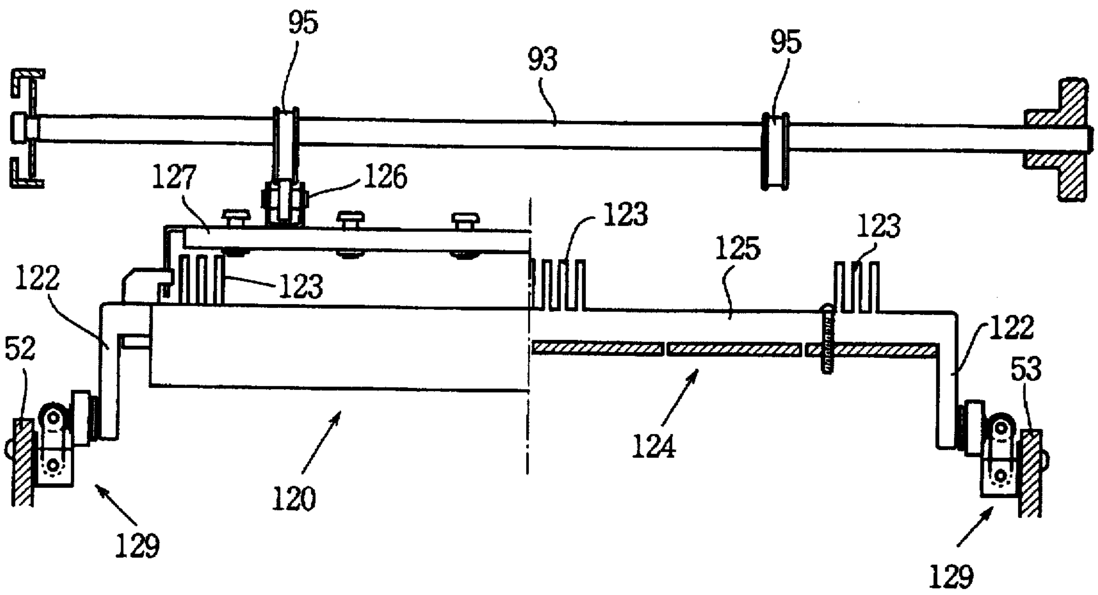
FIG. 9 is a sectional plan view showing a thermal head viewed at the rear.

Referring to FIGS. 5 and 9, the thermal head unit 120 comprises a base plate 125, heating elements 124 provided on the base plate 125, a pair of arms 122 extending from the base plate 125 and rotatably mounted on shafts 128 secured to the side plates of the cover. A plurality of cooling ribs 123 are provided on the base plate 125 opposite to the heating elements 124. A base frame 127 is secured to the base plate 125 on an upper portion of the cooling ribs 123. A plurality of rollers 126 are provided on the frame 127. A pair of position adjusting devices 129 are provided on the shafts 128 for adjusting an axial position of the thermal head unit 120 corresponding to the drum 100. In a proper adjustment, the axial line of the thermal head unit 120 coincides with the diameter of the drum 100.

As shown back in FIG. 1, a drum drive mechanism 40 is provided on the right side plate 32 for driving the drum 100. The mechanism 40 comprises a motor 41 of a stepping motor, a cooling fan 48 for cooling the motor 41, and a plurality of belt pulleys.

Figure 6:
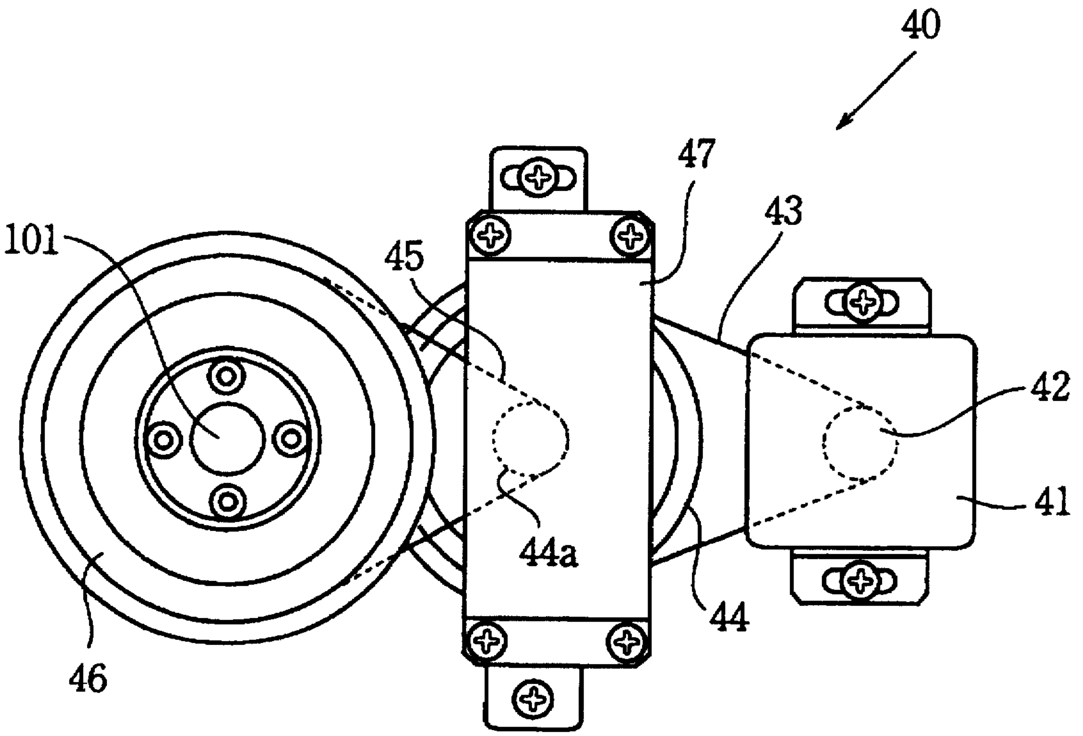
FIG. 6 is a plan view showing a drive mechanism of a drum.
Figure 7:
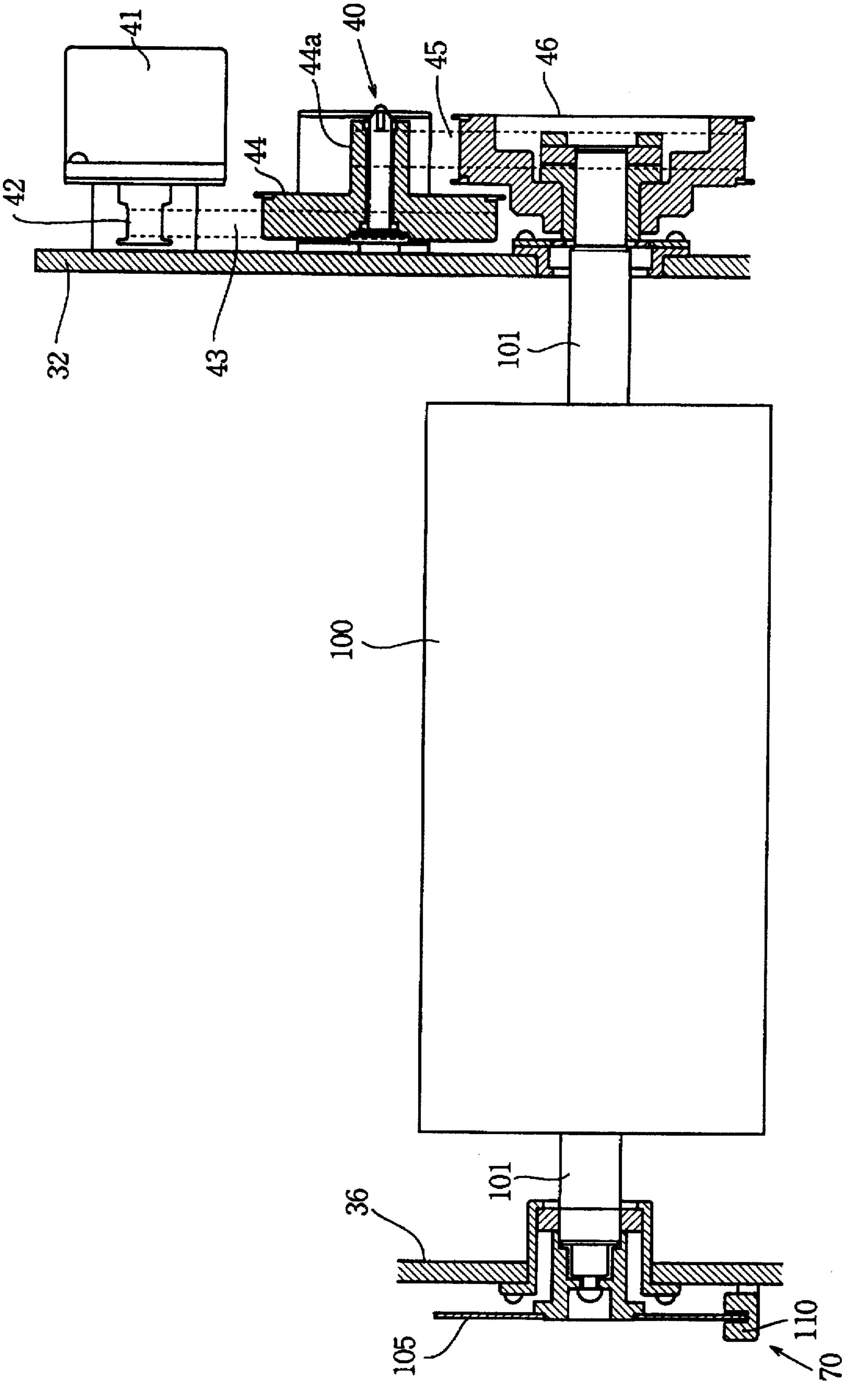
FIG. 7 is a sectional plan view schematically showing the drive mechanism and a rotating position detecting mechanism of the drum.

Referring to FIGS. 6 and 7, a timing belt 43 is provided between a drive shaft 42 of the motor 41 and a pulley 44 protected by a protecting frame 47. A timing belt 45 is provided between a pulley **44*a* coaxial with the pulley 44 and a pulley 46 secured to the shaft 101 of the drum 100**.

On the inner portions of the belts 43 and 45, a plurality of projections (not shown) are formed. Each of the drive shaft 42 and the pulleys 44, **44*a* and 46** has a plurality of grooves (not shown) formed on the circumference thereof to be engaged with the projections of the belts.

Consequently, when the belt pulleys are operated, transmission loss caused by a slipping of the belt is prevented.

Furthermore, the number of grooves for the pulleys is set so that an integral multiple relationship exists between the number of grooves of the respective pulleys. This is done for the purpose of rotating the drum 100 at accurate timings and is hereinafter referenced succinctly as "a relationship of times an integer number".

Figure 2:
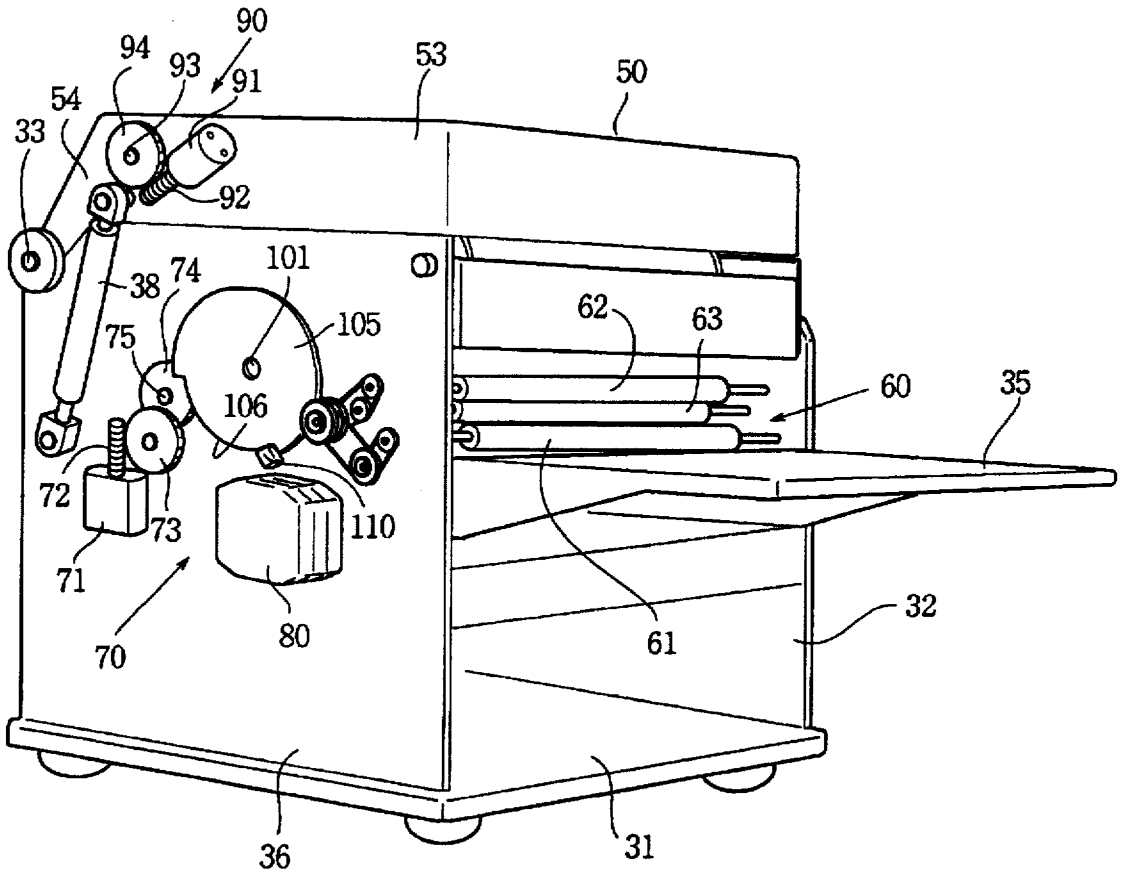
FIG. 2 is a perspective view of the thermal printer viewed at the left.

As shown in FIG. 2, on the left side plate 36, a paper clamp mechanism 70 is provided for clamping the paper on the drum 100. The mechanism 70 comprises a motor 71, a worm 72 connected to the shaft of the motor 71 and engaged with a worm wheel 73, and a gear 74 engaged with a pinion (not shown) coaxial with the worm wheel 73. The gear 74 is secured to a shaft 75 which is rotatably mounted on the side plate 36.

Figure 8:
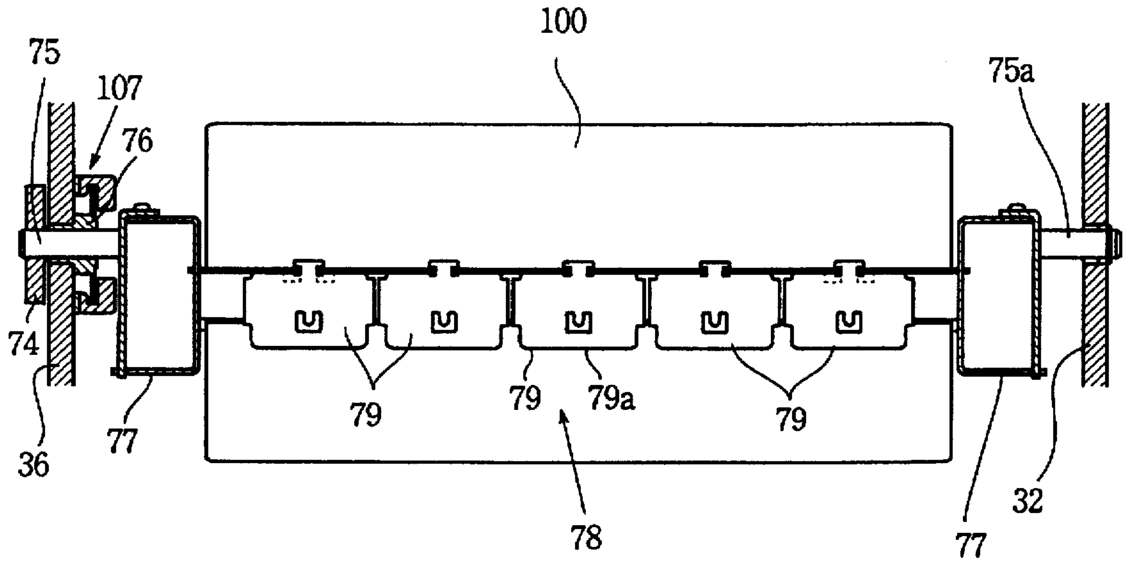
FIG. 8 is a sectional plan view showing a paper clamp mechanism.

Referring to FIG. 8, a shaft **75*a* is rotatably mounted on the right side plate 32 opposite to the shaft 75. A clamp device 78 having a plurality of clampers 79 is secured to the shafts 75 and 75*a* through a pair of cranks 77. The clampers 79 of the clamp device 78 are engaged with a groove 100*a* (FIG. 5) formed on the drum 100 in the axial direction. An edge 79*a* of the clamper 79 is abutted on an edge of the groove 100*a***.

A clamp sensor 107 is provided adjacent to the shaft 75 for detecting an engaging operation of the clamp device 78 with the groove. A shielding disc 76 is secured to the shaft 75. By the rotation of the shielding disc 76, the sensor 107 detects up/down states of the clamp device.

A rotor 105 (FIG. 7) is secured to an end of the drum shaft 101 on the left side plate 36. The rotor 105 has a peripheral notch 106 (FIG. 2) formed on a part of the circumference thereof. As shown in FIG. 7, a home position (HP) sensor 110 is provided on the rotor 105 for sensing the rotation of the drum 100 by the notch 106 and producing on/off signals.

A motor 80 (FIG. 2) is provided on the side plate 36 for rotating the rollers 61 to 65 of the paper feed mechanism 60.

On the left side plate 53 of the cover 50, a thermal head positioning mechanism 90 is provided (FIG. 2). The mechanism 90 comprises a motor 91, a worm 92 connected to the motor 91 and engaged with a worm wheel 94 which is secured to an end of the shaft 93. The shaft 93 is rotatably mounted on the side plates of the cover. As shown in FIG. 9, a plurality of discs 95 are eccentrically secured to the shaft 93 and engaged with the rollers 126 of the thermal head unit 120.

The shaft 93 is rotated to rotate the discs 95 engaged with the rollers 126. When the roller 126 is rotatably engaged with a high cam portion **95*a* as shown in FIG. 5, the head unit 120 is rotated about the shafts 128 in the downward direction. When the head unit 120 is moved down, the heating elements 124 are close to the drum 100. When the roller 126 is engaged with a low cam portion 95*b*, the head unit 120 is upwardly rotated to be disengaged from the drum 100**.

On the right side plate 52 of the cover 50, a head-up sensor 55 and a head-down sensor 56 are provided adjacent to the shaft 93 for detecting up/down states of the thermal head unit 120. A shielding disc (not shown) is secured to the other end of the shaft 93. By the rotation of the shielding disc, the sensors 55 and 56 detect up/down states of the thermal bead unit, respectively.

Figure 10:
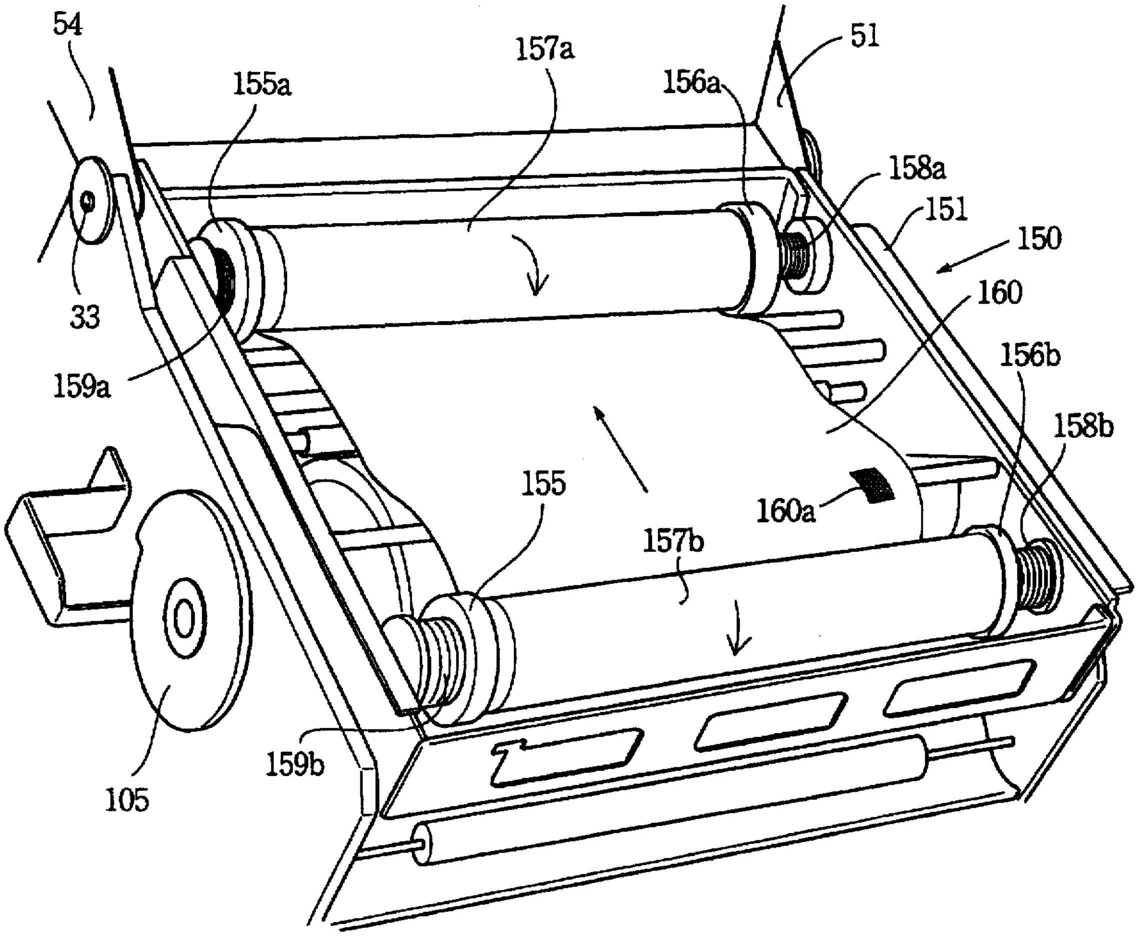
FIG. 10 is a perspective view showing an inked film unit mounted in the thermal printer.
Figure 11:
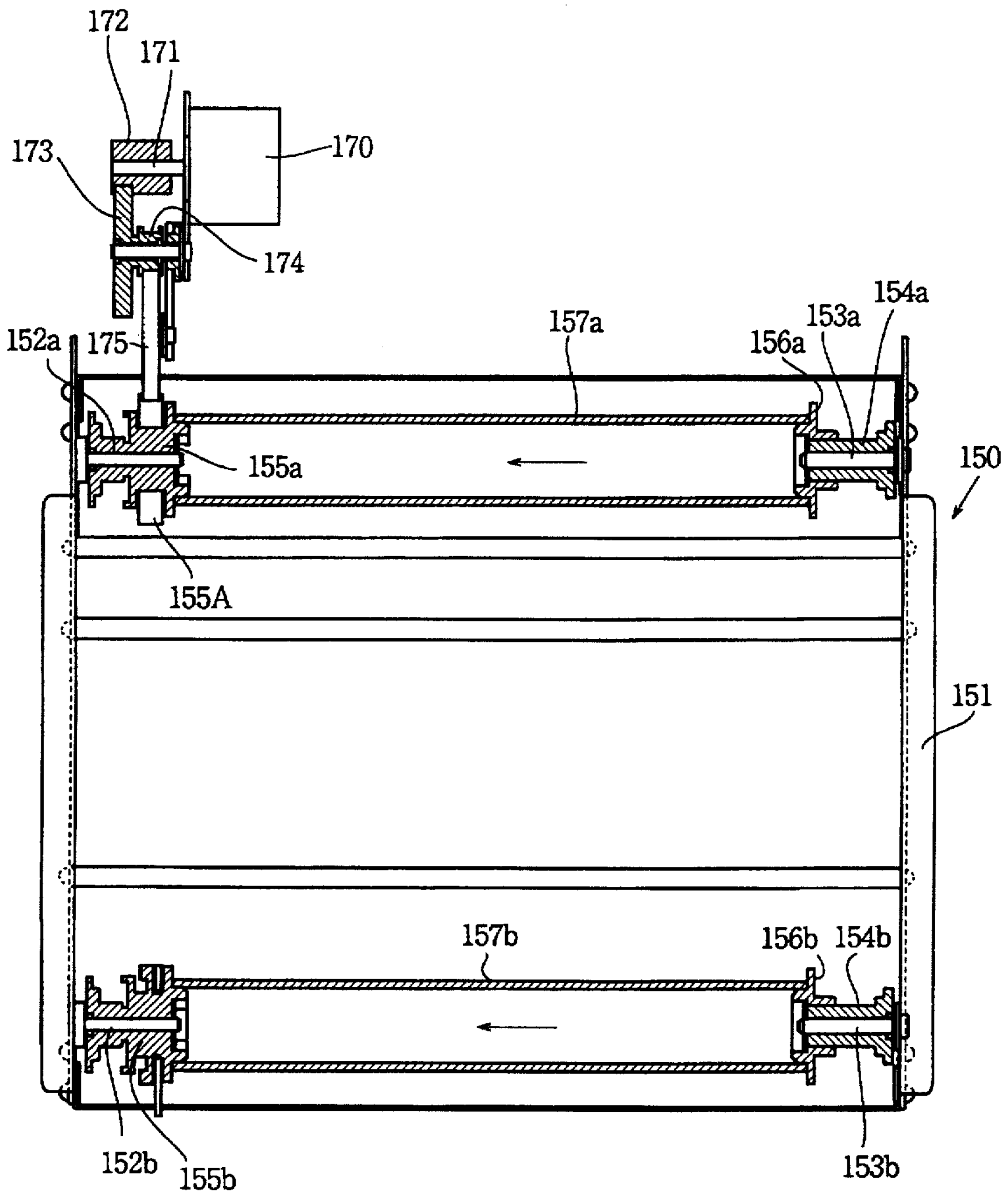
FIG. 11 is a sectional plan view showing the inked film unit.

Referring to FIGS. 10 and 11, an inked film unit 150 having a multi-color inked film 160 is mounted in the printer 30 when printing. The film unit 150 comprises a frame 151, and a pair of inked film rollers **157*a* and 157*b* rotatably mounted in the frame 151 between opposite side plates thereof. A pair of pins 152*a*, 153*a*, and a pair of pins 152*b*, 153*b* are secured to the respective side plates at rear and front portions of the frame 151. On the pins 152*a* and 152*b*, slipping clutches 155*a* and 155*b* are rotatably mounted. Tension springs 159*a* and 159*b* are provided on the clutches for providing friction forces on the clutches. Supporting cylinders 154*a* and 154*b* are secured to the pins 153*a* and 153*b*. Flanges 156*a* and 156*b* are rotatably and slidably mounted on the supporting cylinders 154*a* and 154*b* and urged inwardly by springs 158*a* and 158*b*. The roller 157*a* is mounted on the clutch 155*a* and the flange 156*a* for winding up the inked film 160. The roller 157*b* is mounted on the clutch 155*b* and the flange 156*b* for feeding the inked film 160**.

The inked film 160 has patterns of four colors such as yellow (Y), cyan (C), magenta (M) and black (K) provided thereon as sequential patterns. A color discriminating mark 160*a* is provided on an area of each color pattern in a longitudinal direction of the inked film. An inked film sensor 176 (FIG. 5) is provided in the frame 150 to be positioned at the underside of the inked film 160 for detecting the mark 160*a*, thereby discriminating the area of each color pattern. Each color pattern has a different number of marks. Thus, the sensor 176 discriminates the color in accordance with the number of marks detected.

The lateral width of the inked film 160 is slightly larger than that of the paper. During the printing operation, each color pattern covers the entire paper.

A motor type 170 of a stepping motor is provided for feeding the inked film 160. A gear 155A is secured to the clutch 155*a* and engaged with a gear 175 which is engaged with a pinion 174. A gear 173 coaxial with the pinion 174 is engaged with a pinion 172 secured to a drive shaft 171 of the motor 170. Thus, the power of the motor 170 is transmitted to the roller 157*a* to wind up the inked film 160 on the roller 156*a*. The motor 170 is controlled by pulses with a stable rotation. Thus, the inked film is constantly applied, thereby improving the quality of the printed picture.

When the film unit 150 is mounted in the printer, the feed roller 157*b* is urged to be rotated in the outward direction of the frame by the tension spring 159*b*. Thus, the inked film 160 is fed to the wind-up roller 157*a* by the motor 170 at a predetermined tension.

Figure 12:
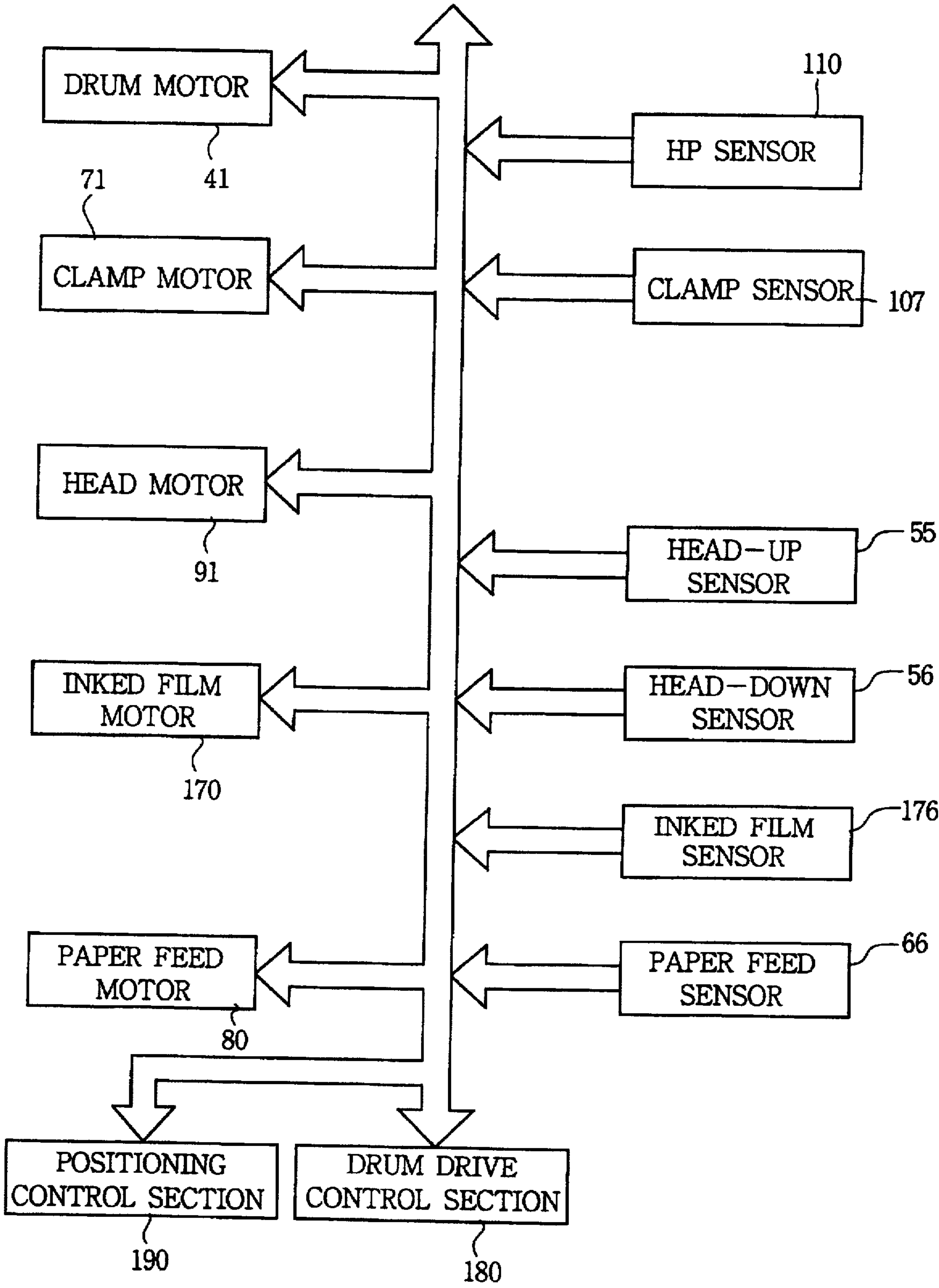
FIG. 12 is a flow chart showing a control system.

Referring to FIG. 12 showing a control system of the thermal printer, outputs of sensors are applied to a drum drive control section 180 and a positioning control section 190.

The drum drive control section 180 applies a control signal to the drum motor 41 where the paper is positioned to the heating elements 124 of the thermal head unit 120 with accuracy.

The positioning control section 190 applies a control signal to the drum motor 41 and the inked film motor 170 for controlling the positioning of the paper and inked film 160 at the same time.

Figure 13:
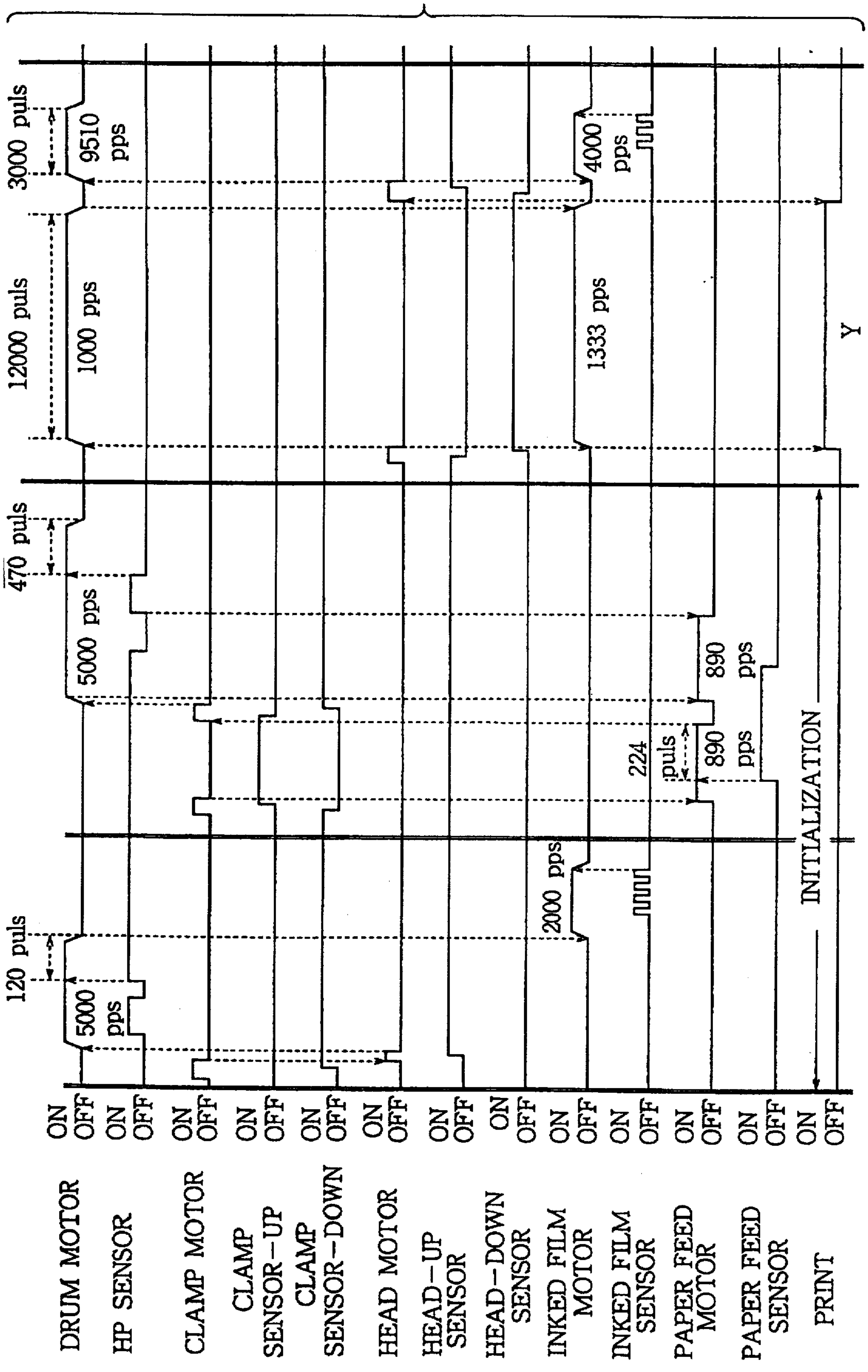
FIG. 13 is a time chart showing a printing operation.
Figure 14:
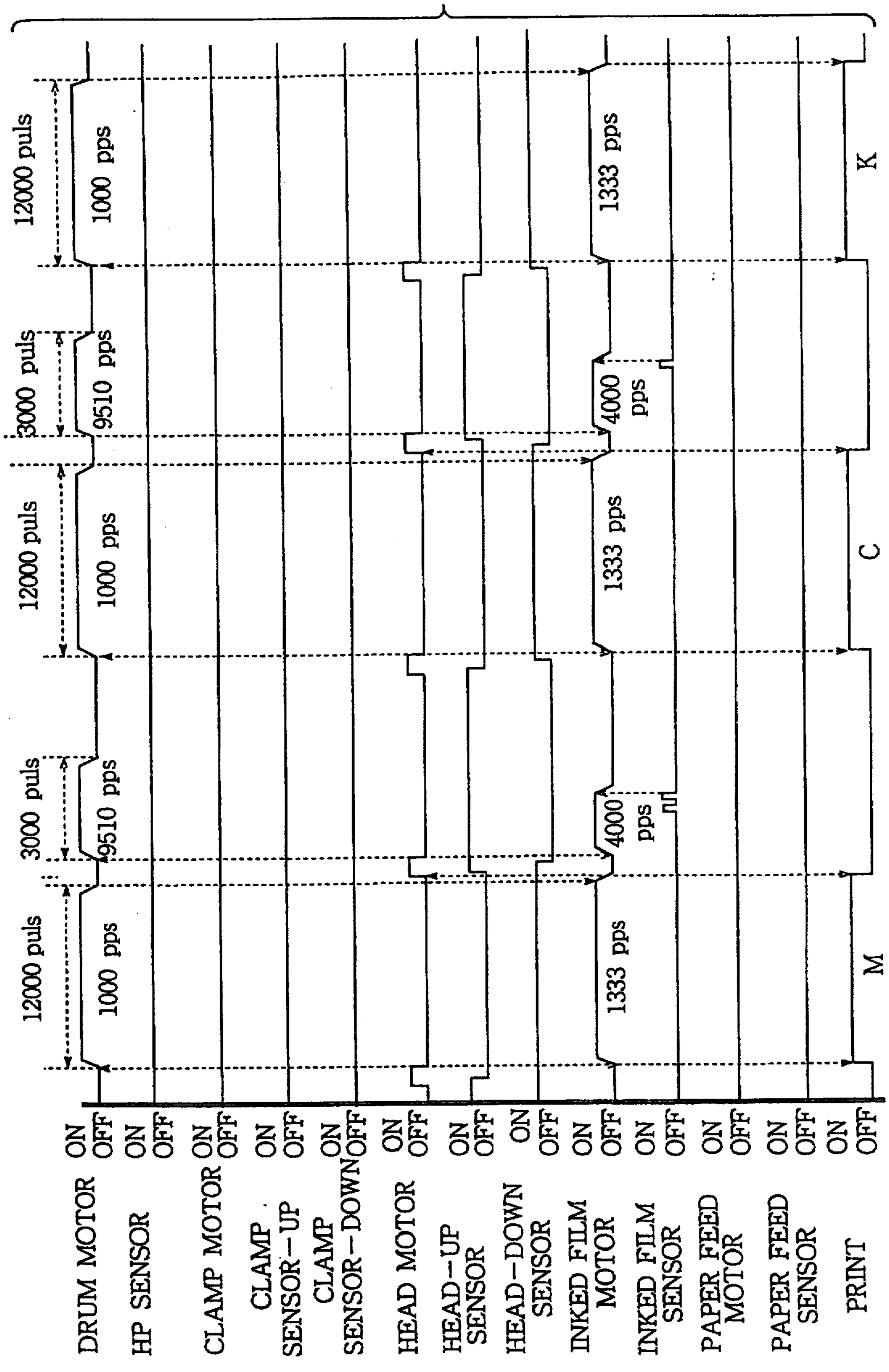
FIG. 14 is a time chart showing a further printing operation.
Figure 15:
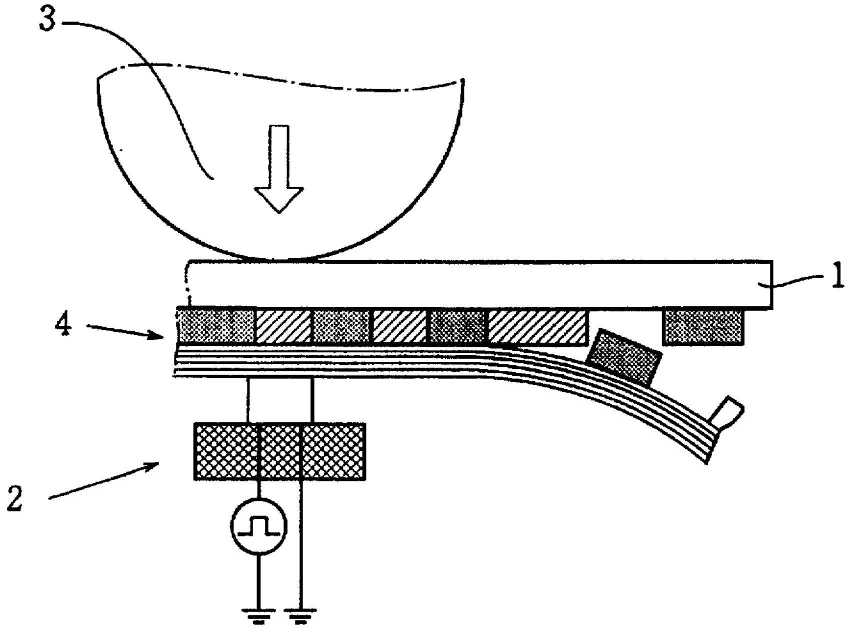
FIG.15 PRIOR ART
FIG. 15 is a schematic diagram showing a conventional multi-color thermal printer.
Figure 16:
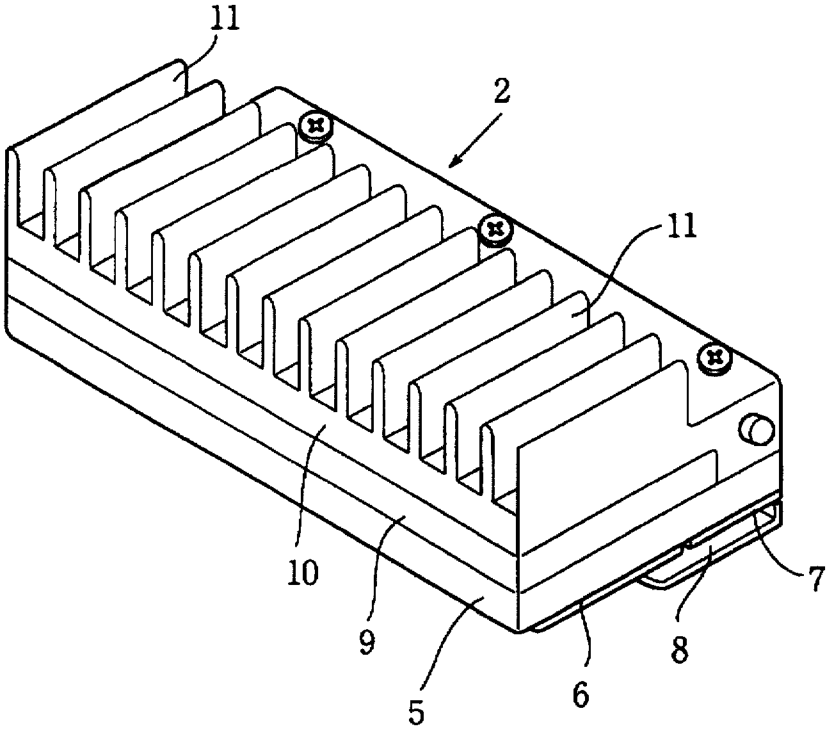
FIG.16 PRIOR ART
FIG. 16 is perspective view showing a conventional thermal head.

The printing operation of the thermal printer will be described with reference to the time charts of FIGS. 13 and 14.

When the power of the printer is turned on, the system is initialized first. In the initialization, the clamp motor 71 is driven to rotate the shaft 75 through the worm 72, worm wheel 73 and gear 74. The cranks 77 are rotated to engage the clampers 79 of the clamp device 78 with the groove 100*a* of the drum 100. The sensor 107 detects a clamp-down state and the motor 71 stops.

The head motor 91 is driven for moving up the thermal head unit 120. The shaft 93 is rotated through the worm 92 and worm wheel 94 to rotate the discs 95. The low cam portions 95*b* engage with the rollers 126 of the thermal head unit 120 so that the head unit is rotated up about the shafts 128 and disengaged from the drum 100. The head-up sensor 55 detects the head-up state, thereby stopping the motor 91.

The drum motor 41 is driven to rotate the drum 100 through the belt 43, pulleys. 44 and 44*a*, belt 45, pulley 46 and shaft 101. The rotor 105 (FIG. 2) secured to the shaft 101 is rotated. The HP sensor 110 detects the rotation of the drum 100 by the notch 106 of the rotor 105 and detects the position of the drum from the home position to produce the on/off signals.

When the drum motor 41 is stopped, the film motor 170 is driven to rotate the wind-up roller 157*a* through the pinion 172, gear 173, pinion 174, gears 175 and 155A, and clutch 155*a*. Thus, the inked film 160 on the feed roller 157*b* is wound up on the roller 157*a*.

The clamp motor 71 is driven to disengage the clamp device 78 from the groove 100*a* of the drum 100. The sensor 107 detects the clamp-up state to stop the motor 71.

The paper feed motor 80 is driven to rotate the rollers 61 to 64 to feed the paper on the paper stand 35 to the drum 100. When an end of the paper reaches the groove 100*a*, the sensor 66 detects the position of the paper to stop the motor 80.

The clamp motor 71 is driven again to engage the clamp device 78 with the groove 100*a*. Thus, the paper is clamped on the drum at edges 79*a* of the clampers 79.

When the motor 71 is stopped, the drum motor 41 is driven by the signal of the drum drive control section 180 and the feed motor 80 is driven to rotate rollers 61 to 64. The drum is rotated in a normal state in the direction shown by an arrow a of FIG. 5 so that the paper is fed by the rollers 61 to 64 and wound up on the drum. The paper is abutted on the drum by rollers 102.

The drum motor 41 is stopped to stop the drum at an initial position of the paper corresponding to the thermal head unit 120. Thus, the initialization is completed.

Then, printing operation by four colors Y, M, C and K is started in order. First, printing by the color Y is operated.

The head motor 91 is driven to move down the thermal head unit 120. The high cam portions 95*a* of the discs 95 on the shaft 93 are engaged with the rollers 126 of the head unit 120 to rotate down the head unit about the shafts 128 so that heating elements 124 engage with the inked film 160 on the paper. The head-down sensor 56 detects the head-down state to stop the motor 91.

The drum motor 41, the feed motor 80 and the film motor 170 are driven at the same time to print a picture of yellow on the paper by dots in mosaic. When printing by yellow is finished, the motors 41, 80 and 170 are stopped at the same time.

For the next printing by magenta, the paper and the inked film 160 are positioned at the same time. Namely, the head motor 91 is driven to disengage the thermal head unit 120 from the inked film. The motor 91 is stopped, while the motors 41, 80 and 170 are driven at the same time in accordance with the signal of the positioning control section 190. The drum 100 and rollers 63, 65 are rotated in the reverse direction shown by an arrow b so that the paper is registered to the initial position. On the other hand, the inked film 160 is fed to a position where the magenta pattern reaches the initial position of the paper at the same time. Thus, the registration of the paper and the inked film is completed.

The printing operation by the magenta is performed in the same manner as aforementioned. The magenta pattern is overlapped on the picture of yellow printed on the paper. Since the drum 100 is rotated by belt pulleys having the relationship of times of the integer number, the paper is accurately positioned, thereby obtaining a good of picture quality.

Thereafter, printing operations by cyan pattern and black patterns are performed in order in the same manner as described above.

In accordance with the present invention, each of the belt pulleys for driving the paper drum has a plurality of grooves which are determined to the relationship of times of the integer number. Consequently, the paper is accurately positioned by the rotations of the drum for overlapping multiple colors, thereby improving a quality of multi-color printing.

Furthermore, since the paper and the inked film are fed to the respective proper printing positions at the same time, printing time is reduced.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A multi-color thermal printer comprising:

a paper feed mechanism including a plurality of paper feed rollers for feeding a sheet of paper;

a drum for mounting the sheet of paper fed by the paper feed rollers;

a drum motor for driving the drum;

a clamp device for clamping the paper on the drum;

a transmission device including a plurality of pulleys and a timing belt for transmitting an output of the drum motor to the drum, each of the pulleys having a plurality of grooves to be engaged with projections of the timing belt and a number of the grooves of each of the pulleys being integer times of the number of 13 the grooves of the other pulleys;

an inked film unit provided adjacent the drum, the inked film unit having rollers for winding up a multi-color inked film, the multi-color inked film having a plurality of color areas each of which has an individual color pattern;

a film motor for driving the rollers so as to wind up the inked film;

print means including a thermal print head for applying ink from the color area corresponding to a current color printing onto the sheet of paper; and positioning means for positioning the sheet of paper and the color area corresponding to a next color printing to an initial position prior to the next color printing;

wherein said positioning means drives the drum, the paper feed rollers and the inked film at the same time prior to the next color printing, in such a manner that the drum and paper feed rollers are driven in a reverse direction to the initial position, and the inked film is driven so that the color pattern for the next color printing is fed to the initial position.

2. A multi-color thermal printer comprising:

a drum for supporting a sheet of paper;

a drum motor for driving said drum;

a clamp device for clamping the paper to said drum;

a transmission device including a plurality of pulleys and at least one timing belt engaging said pulleys for transmitting an output of said drum motor to said drum, each one of said pulleys having a number of grooves arranged about a circumference of said pulley for receiving respective projections of the timing belt, wherein the number of grooves of one of said pulleys is an integral multiple of the number of grooves of remaining ones of said pulleys;

an inked film unit provided adjacent the drum, the inked film unit having rollers for advancing a multi-color inked film;

a film motor for driving the rollers to advance said inked film;

paper feed rollers for feeding the paper to said drum; and means for driving said drum, said paper feed rollers and said inked film rollers simultaneously, in preparation for printing an additional color following a previous printing operation for a previous color; wherein said driving means drives said drum and said paper feed rollers in a reverse direction that is opposite an advancing direction utilized during the previous printing operation, thereby reversing the paper to an initial position; and said driving means advances said inked film so as to position a color pattern corresponding to the additional color to the initial position.

* * * * *